United States Patent [19]

Loomis

[11] Patent Number: 5,478,389
[45] Date of Patent: Dec. 26, 1995

[54] POLLUTION REMEDIAL COMPOSITION AND ITS PREPARATION

[75] Inventor: Richard E. Loomis, Texarkana, Ark.

[73] Assignee: Loomis Family Trust, Texarkana, Ark.

[21] Appl. No.: 234,273

[22] Filed: Apr. 28, 1994

Related U.S. Application Data

[63] Continuation of Ser. No. 766,424, Sep. 25, 1991, abandoned.

[51] Int. Cl.$^6$ .............. C09K 3/32; B01J 13/00; C04B 18/04; C11D 3/36
[52] U.S. Cl. .......... 106/630; 106/634; 210/925; 252/139; 252/601; 252/602; 252/634; 252/315.5; 252/DIG. 5; 588/252; 588/253; 588/901
[58] Field of Search .............. 252/315.5, 352, 252/601, 602, 634, 139, 315.6; 106/603, 617, 630, 634; 210/925; 588/252, 253, 901; 405/264

[56] References Cited

U.S. PATENT DOCUMENTS

| | | | |
|---|---|---|---|
| 2,521,839 | 9/1950 | Feagin | 106/634 X |
| 3,004,921 | 10/1961 | Stossel | 252/309 |
| 3,202,214 | 8/1965 | McLaughlin, Jr. | 166/292 |
| 3,630,952 | 12/1971 | Nielsen | 252/309 |
| 3,956,197 | 5/1976 | Schoenholz et al. | 252/139 X |
| 4,056,937 | 11/1977 | Suzuki | 405/264 |
| 4,097,385 | 6/1978 | von Bonin | 252/602 |
| 4,197,197 | 4/1980 | Abaeva et al. | 210/925 X |
| 4,226,736 | 10/1980 | Bush et al. | 252/315.5 X |
| 4,528,039 | 7/1985 | Rubin et al. | 252/139 X |
| 4,799,549 | 1/1989 | Vinot et al. | 252/315.5 X |
| 4,812,242 | 3/1989 | James et al. | 210/925 X |
| 4,863,518 | 9/1989 | Blount | 106/634 X |
| 4,940,844 | 7/1990 | Blunt | 106/603 X |
| 5,076,938 | 12/1991 | Noonan et al. | 210/925 X |

FOREIGN PATENT DOCUMENTS

| | | | |
|---|---|---|---|
| 2136824 | 9/1984 | United Kingdom | 106/634 |

*Primary Examiner*—Richard D. Lovering
*Attorney, Agent, or Firm*—Konneker & Bush

[57] ABSTRACT

Pollution remedial compositions are disclosed which comprise a soluble silicate, a surfactant, a polyol, and water.

27 Claims, 5 Drawing Sheets

POLLUTION REMEDIAL COMPOSITION AND ITS PREPARATION

This is a continuation, of application Ser. No. 07/766,424, filed Sep. 25, 1991, now abandoned.

BACKGROUND OF THE INVENTION

This invention relates to a pollution remedial composition, its manufacture, and method of using the pollution remedial composition.

Hazardous Wastes, toxic spills, contaminated water, contaminated soil, and pollutants are but a few of the environmental problems we face today all over the world. Since late 1970's, great concern was expressed over the disposal of hazardous or toxic wastes.

Common pollutants in soil and in water include asbestos, polychlorinated biphenyls ("PCB"), chlorinated hydrocarbons, petroleum products, pesticides, herbicides, and heavy metals. Most of these pollutants are man-made and have relatively long half-lives. Recent development and dissemination of such sophisticated and sensitive equipment as gas chromatographs, coupled with flame ionization and electron capture detectors, have allowed detection of pollutants with unheard of precision and accuracy.

Asbestos was used extensively prior to the 1980's to insulate structural steel and heating ducts, as a fibrous material in acoustical ceilings, in various applications on space heating and cooling units, in roofing papers, and in vinyl tiles adhesives. Asbestos can be analyzed and identified rapidly and inexpensively by microscopic analysis. Removal of the asbestos from a contaminated site is possible, but the task is invariably expensive. Further, it is never the best solution if the job is not properly done.

PGB's are widely used as insulation in electrical equipment, such as transformers and capacitors. If an electrical equipment contains PCB's, the equipment, its support platform, and the soil under and around the area most likely will contain these pollutants. The polymers are, to a certain extent, fire resistant. When they are burned, however, some toxic dioxin is formed as a by-product of the combustion, along with phosgene and hydrochloric acid. The toxic dioxin produced is the toxin reported in "Agent Orange." PCB's biodegrade very slowly. Their very low vapor pressure precludes their loss to the atmosphere. Thus, cleanup of PCB's is particularly expensive since incineration is the normal method of decontamination of removed material.

Chlorinated hydrocarbons have been widely used for at least five decades. These materials are used in paint thinners, paint strippers, degreasers, and "dry cleaning" solvents. Chlorinated hydrocarbons generally include dichloromethane, chloroform, carbon tetrachloride, dichloroethenes, and others. Carbon tetrachloride is very toxic and when burned forms phosgene and hydrochloric acid. Chlorinated hydrocarbons have relatively high vapor pressure, and their density is greater than that of water. These solvents are very likely to enter soil and groundwater. These materials enter the soil rapidly and move downward as liquid. Decontamination soil containing this class of pollutants is usually done by excavation and gas extraction. At one time, the decontamination was done by volatilization to atmosphere. Now, this old method is not considered acceptable in most areas.

Petroleum product pollutants are common in virtually every area used by man. Petroleum products include motor fuels, standard solvents, kerosene, and paint thinners. Benzene, a constituent of gasoline, is carcinogenic. The most prevalent risk today is from leaking tanks. There is usually very little opportunity for degradation deep in the soil column or in an underground water column.

Pesticides and herbicides have been in general use since the early 1940's. They were used on farm crops, for right-of-way control, for forest management, and even for decorative management in houses and gardens. Pesticides are not only toxic but degrade slowly. Cleanup of these pollutants is exceedingly expensive.

The most common heavy metal pollutants include lead, chromium, and mercury. Lead has been widely used in car batteries and paints. These heavy metals do not degrade because they are basic elements. Some, such as mercury, are, however, capable of biotransformation from inorganic to organic forms. One of the techniques to decontaminate such pollutants is adjustment of the pH. Oxidation and reduction actions are also used to decontaminate these pollutants.

Although not considered a pollutant, forest fires, oil-field fires and other fires are likewise hazardous. They are hazardous not only because of the damage they cause to the properties and materials, but also because of the gases generated by them.

For large scale decontamination of soil pollutants, one of the ways currently used is to excavate the soil, spread the soil out on a polyethylene film sheet, then allow the low-boiling hydrocarbons to be released into the air. Afterward, the soil must be taken to a hazardous waste landfill or even transported to an incinerator where the remaining pollutants are burnt. In burning this soil, gases, some toxic, are released to the air. Even after this costly procedure, the remainder still may have to be deposited into a hazardous waste landfill.

Biological treatment of wastes has also been tried. In this method, the pollutants are exposed to some microorganisms. The method will fail, however, if the annual rainfall is high and the erosion potential is not minimal. Difficulties also arise when the technique is applied in a careless manner.

It is thus clear that there is an urgent need for an effective pollution remedial composition.

SUMMARY OF THE INVENTION

It is therefore an object of the present invention to provide a new and effective pollution remedial composition, method of its manufacture, and method of using the composition.

It is another object of the present invention to provide a pollution remedial composition that can effectively decontaminate an area of ground, or a volume of water, containing various pollutants.

It is yet another object of the present invention to provide a pollution remedial composition that can eliminate the high cost of removal and excavating contaminated soil and water.

It is also an object of the present invention to provide a pollution remedial composition that can be used, under certain conditions, to reclaim a heavy metal from a sludge.

It is another object of the present invention to provide a pollution remedial composition that can effectively extinguish fires.

It is still another object of the present invention to provide a pollution remedial composition that can de-grease oils from an area, either an area from a mammalian skin or an area on a driveway.

It is also an object of the present invention to provide a pollution remedial composition containing: From about 40 to about 75 volume % of a soluble silicate; from about 0.25 to about 5 volume % of a surfactant; from about 1 to about 5 volume % of a polyol; and the remainder water.

It is a further object of the present invention to provide a method for preparing a pollution remedial composition containing the steps of: Adding with agitation, from about 0.25 to about 1 volume % of an anionic surfactant to water, ranging from about 35 to about 45 volume %, to obtain a first substantially homogeneous resultant mixture; adding, with agitation, from about 1 to about 2 volume % of an ethylene glycol to the first resultant mixture to obtain a second substantially homogeneous resultant mixture; adding, with agitation, from about 0.2 to about 1 weight percent of a combination of equal amount of citric acid and sodium chloride to the second resultant mixture to obtain a third substantially homogeneous resultant mixture; and adding, with agitation, from about 55 to about 60 volume % of sodium silicate to the third resultant mixture to give a substantially homogeneous said remedial composition.

It is still another object of the present invention to provide a method for remedying an area of ground polluted with contaminants containing the steps of: Administering evenly to a polluted area a sufficient amount of a pollution remedial composition to decontaminate the area; simultaneously tilling the area until the pollution remedial composition is substantially well dispersed in the area; and allowing the area to dry.

DETAILED DISCUSSION

Figure 1:
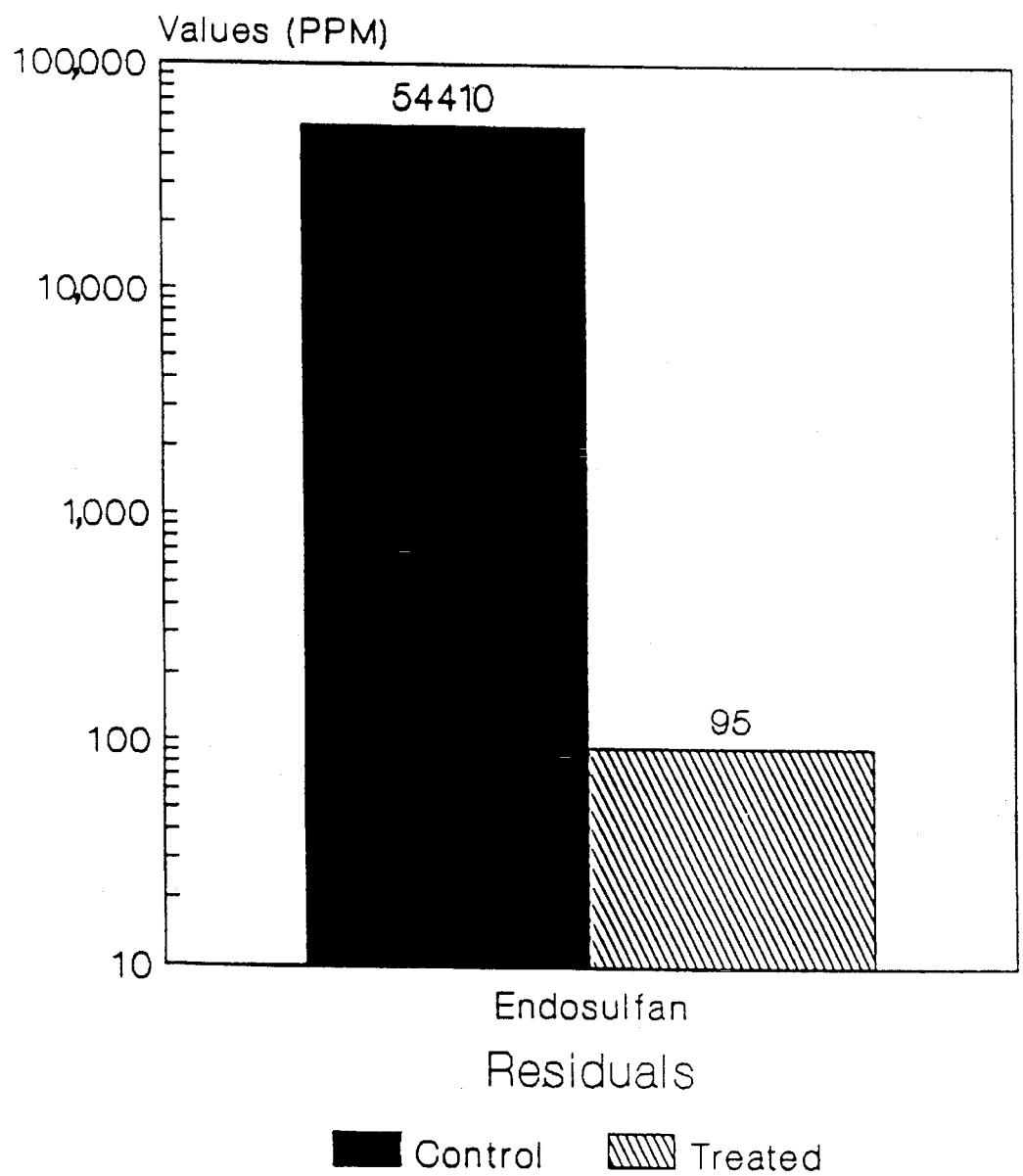
FIG. 1 is a graph depicting changes in the concentration of endosulfan, an insecticide, before and after treatment with the pollution remedial composition of the present invention.
Figure 2:
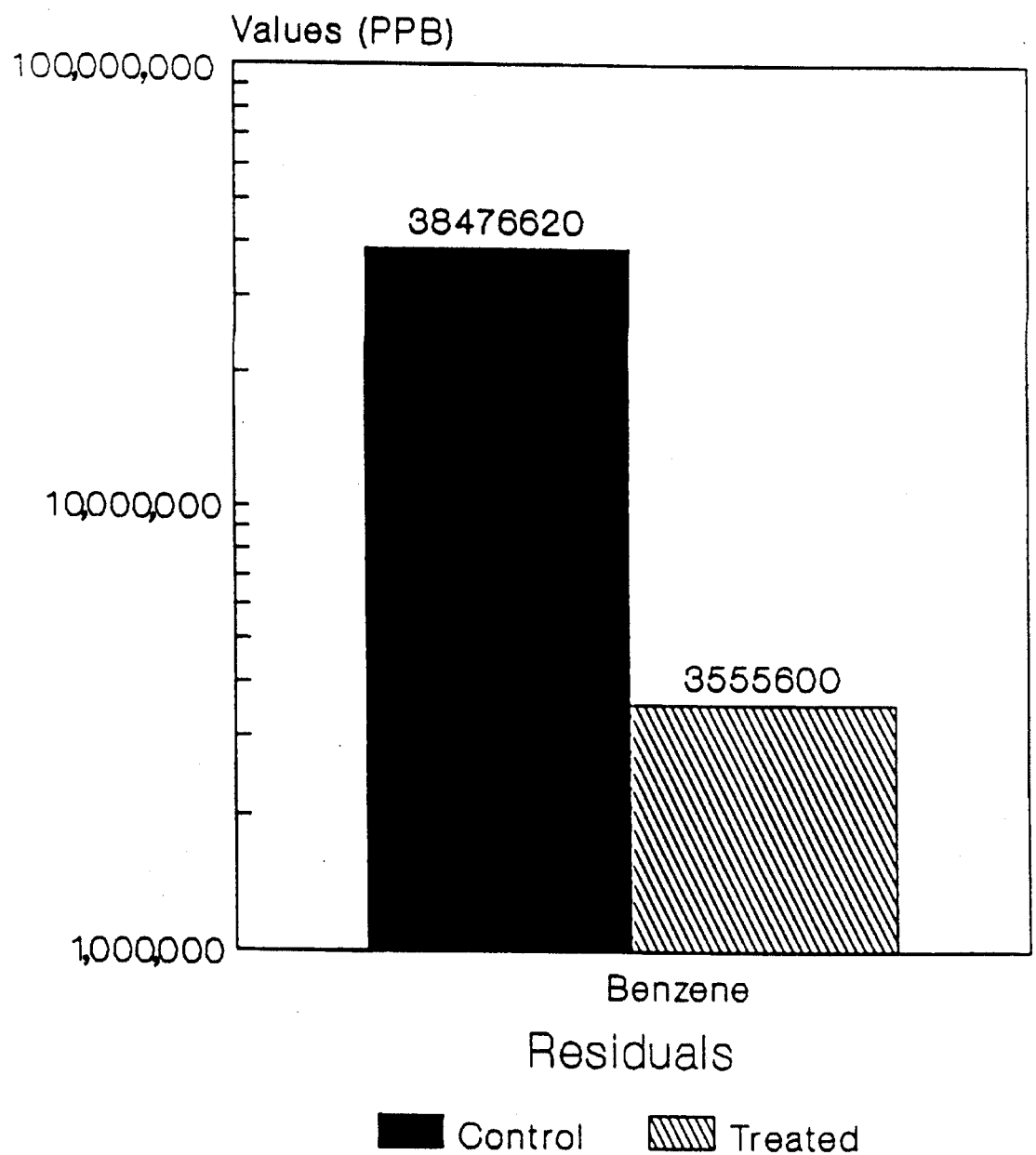
FIG. 2 is a graph depicting changes in the concentration of benzene before and after treatment with the pollution remedial composition of the present invention.
Figure 3:
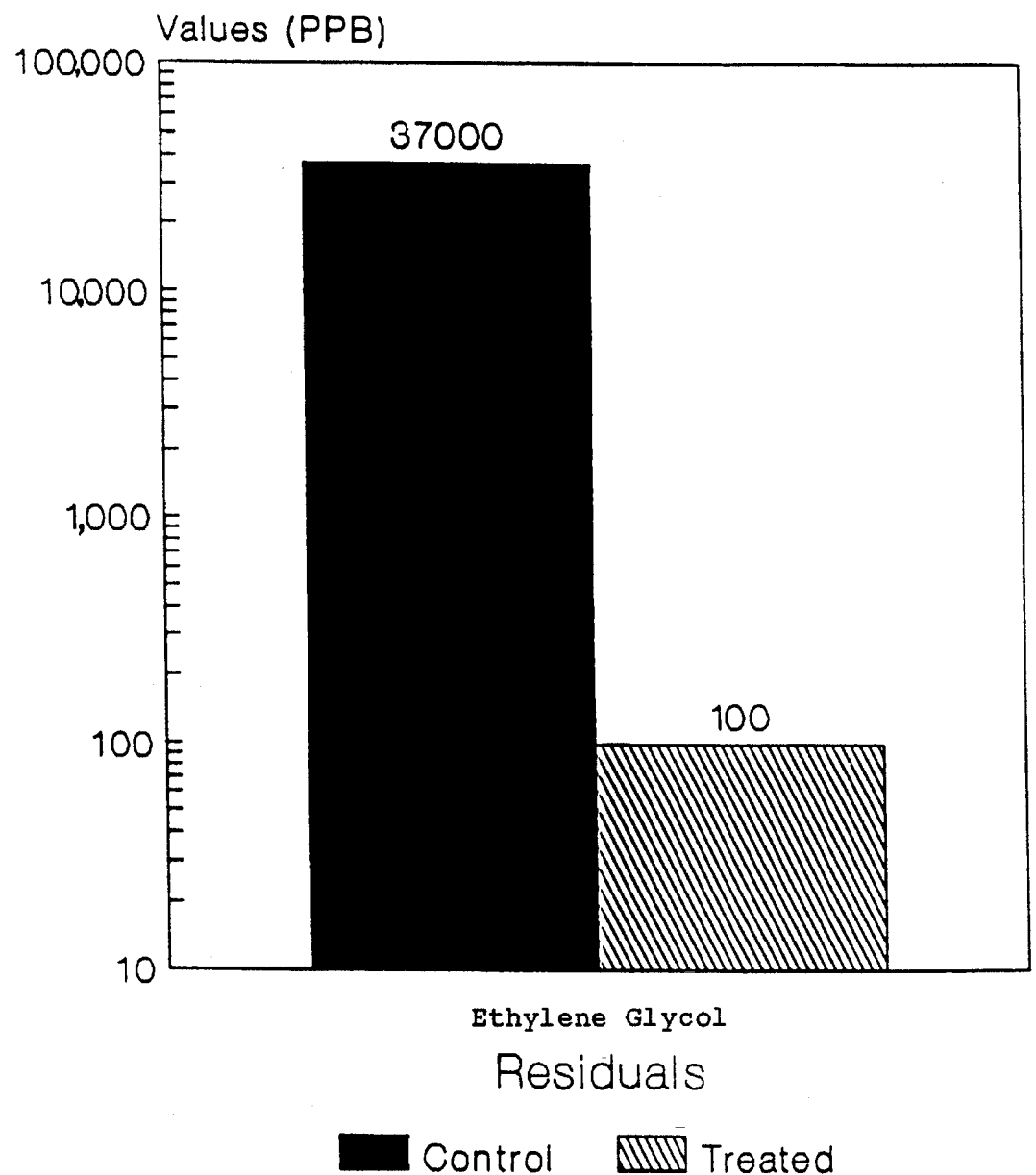
FIG. 3 is a graph depicting changes in the concentration of ethylene glycol before and after treatment with the pollution remedial composition of the present invention.
Figure 4:
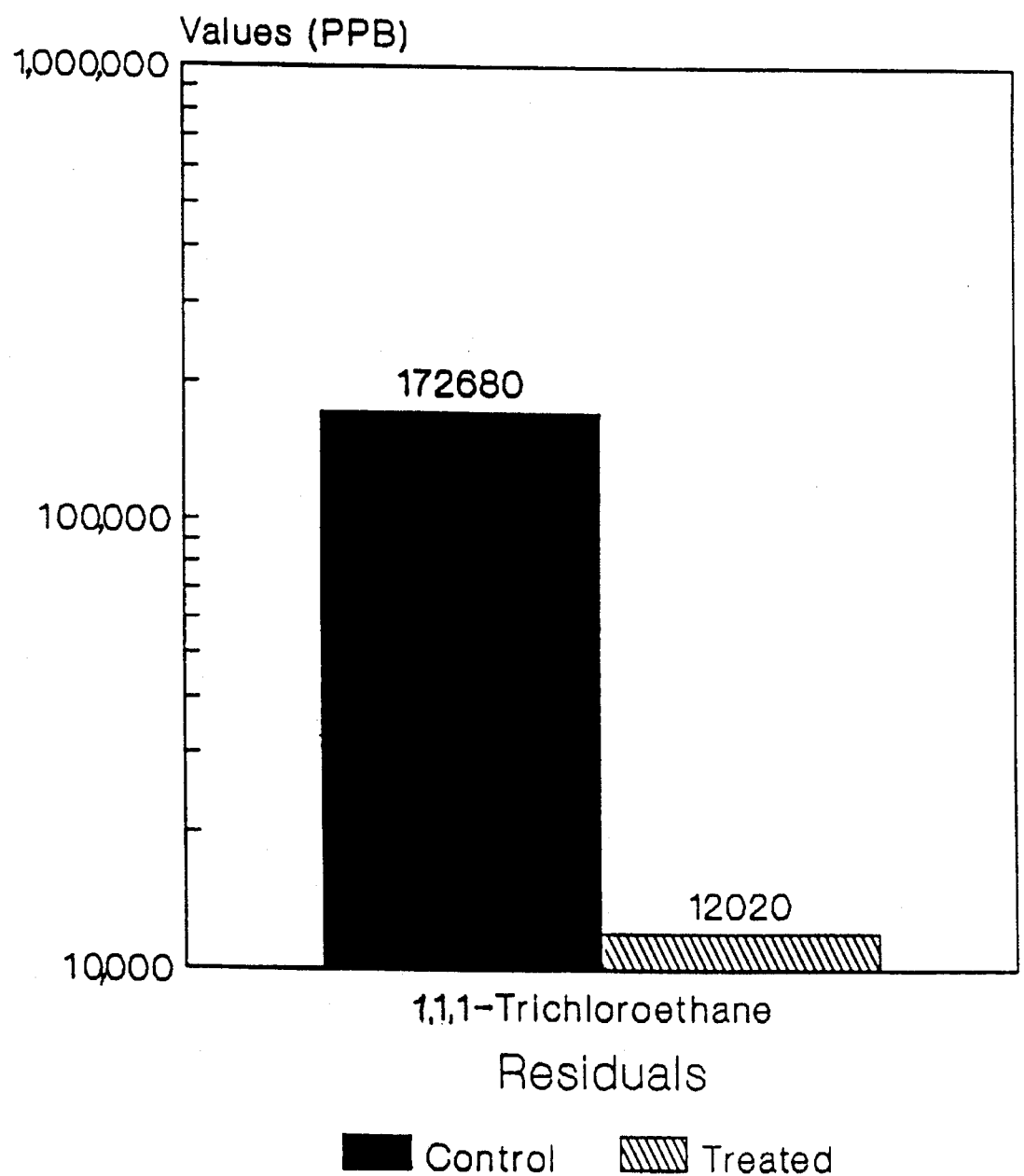
FIG. 4 is a graph depicting changes in the concentration of 1,1,1-trichloroethane before and after treatment with the pollution remedial composition of the present invention.

Broadly, the pollution remedial composition of the present invention contains from about 40 to about 75 volume % of a soluble silicate; from about 0.25 to about 5 volume % of a surfactant; from about 1 to about 5 volume % of a polyol; and the remainder water.

Optional ingredients for the present invention include sodium chloride, citric acid, and glycerine.

Soluble silicates are systems containing varying proportions of silica and an alkali metal or quaternary ammonium ion. The most common and most widely used soluble silicates are those of sodium and potassium. Ordinarily, soluble silicates can be produced over a wide range of stoichiometric and non-stoichiometric composition and are distinguished by the ratio of silica to alkali metal. The ratio is generally expressed as the weight percent ratio of silica to alkali-metal oxide.

Sodium silicates have wide application in many types of detergents and cleaning compounds. They have also been used for many years as adhesives and cements. Thus, they find wide application for pelletizing, granulating, and briqueting finely divided particles, such as clays, fertilizers, and ores. Sodium silicates also are used as bonding$_s$ materials for foundry mold and core compositions. They have also been used as coatings, to protect against water-line corrosion in tanks. Soluble alkali-metal silicate solutions are not compatible with most organic water-miscible solvents. The addition of organic solvents, such as alcohols and ketones, causes phase separation into separate liquid layers. Nevertheless, a few organic systems, such as polyols, are compatible and miscible with alkali-metal silicate solutions. Examples of polyols include glycols, glycerins, sugars, and polyethylene glycols.

For the present invention, the most preferred soluble silicate is sodium silicate. Usable commercial sodium silicates include Sodium Silicate Liquid Grade 42 from Occidental Chemical Corp., Niagara Falls, N.Y., and Power Silicate, Crofton, Md. Soluble sodium silicate in this invention is present at a level from about 40 to about 75%, based on the total volume of the final pollution remedial composition. Preferably, the ingredient should be present at a level from about 55 to about 60 volume %. Most preferably, about 57.5 volume % of the soluble sodium silicate should be used.

The next ingredient used for the pollution remedial composition of the present invention is a surfactant.

A surfactant is an organic compound consisting of two parts: (1) A hydrophobic portion, usually including a long hydrocarbon chain; and (2) a hydrophilic portion which renders the compound sufficiently soluble in water or other polar solvents. The combination of hydrophobic and hydrophilic portions in a surfactant render the surfactant surface-active and thus able to concentrate at the interface between a surfactant solution and another phase such as soil or other substrate to be cleansed.

Surfactants are usually classified into: (1) Anionic, where the hydrophilic portion of the molecule carries a negative charge; (2) cationics, where the hydrophilic portion of the molecule carries a positive charge; and (3) nonionics, which do not dissociate, but generally derive their hydrophilic portions from polyhydroxy or polyethoxy structures. Other surfactants, though less common, are ampholytic and zwitterionic surfactants. The most commonly used surfactants are the anionic surfactants. Generally, they are linear sodium alkyl benzene sulfonate, linear alkyl sulfates, linear alkyl ethoxy sulfates, and organo-phosphoric acid esters.

For this invention, the preferred surfactants are the anionic surfactants. Further, the most preferred anionic surfactants are esters of organo-phosphoric acid. Commercially, organo-phosphoric acid ester is sold under the tradename "T MULZ," No. 598 480, available from Harcros Chemicals Inc., Kansas City, Kans. This commercial product has a boiling point of 290° F. @ 760 mm Hg. The specific gravity (H(2)0=1) is 1.111 @77° F. The pH of a 1% aqueous solution of this product is in the range of 2 to 3. It is a clear amber liquid.

The surfactant in this invention is present at a level from about 0.25 to about 5%, based on the total volume of the final pollution remedial composition. Preferably, this ingredient should be present at a level from about 0.25 to about 1 volume %. Most preferably, about 0.5 volume % of the anionic surfactant, the organo-phosphoric acid ester ("T Mulz" No. 598 480) should be used.

The next ingredient used for the present invention is a polyol. Known polyols include different glycols, glycerins, sugars, and polyethylene glycols. These polyols are compatible and miscible with alkali-metal silicate solutions.

The preferred polyol for this invention is ethylene glycol. Ethylene glycol has a molecular weight of 62; a boiling point of 197.6° C. (760 mm Hg); a specific gravity of 1.1155 (20° C./20° C.); and a freezing point in air of −13° C. (760 mm Hg). It is completely soluble in water. Ethylene glycol is traditionally associated with its use as an antifreeze for internal-combustion engine cooling systems. The compound has also been used in the production of polyesters for fibers, films, and coating. Commercially, ethylene glycol can be purchased from Dow Chemical U.S.A., Midland, Mich.

Polyol in this invention is present at a level from about 1 to about 5%, based on the total volume of the final pollution remedial composition. Preferably, polyol should be present at a level from about 1 to about 2 volume %. Most preferably, about 1.5 volume % of the ethylene glycol should be used.

Water forms the remainder of the pollution remedial composition of the present invention. It can be present from about 10 to about 58%, based on the total volume of the final pollution remedial composition. Preferably, it should be present from about 35 to about 45 volume %. Most preferably, it should be present in an amount of about 40 volume %.

Sodium chloride is an optional ingredient that can be included in the pollution remedial composition of the present invention. Sodium chloride is present at a level ranging from about 0.1 to about 5%, based on the total weight of the final pollution remedial composition. Preferably, the weight percent of sodium chloride should be from about 0.1 to about 0.5. Most preferably, sodium chloride should be present in about 0.25 weight %.

Another optional ingredient that can be used in the pollution remedial composition of the present invention is citric acid. Citric acid is soluble in water or alcohol. The compound is a tribasic acid, forming mono-, di-, and tri- series of salts and esters. It is a white crystalline solid, having a melting point of 153° C. Citric acid is present at a level ranging from about 0.1 to about 5%, based on the total weight of the final pollution remedial composition. Preferably, the weight percent of citric should be from about 0.1 to about 0.5. Most preferably, citric acid should be present in about 0.25 weight %. The weight percent of citric acid is normally maintained at a level equal to that of sodium chloride in the pollution remedial composition of the present invention.

Another optional ingredient for the pollution remedial composition of the present invention is glycerins. In fact, glycerins can be used to replace the combination of sodium chloride and citric acid. For the present invention, about 1 to about 5%, based on the total volume of the final pollution remedial composition, of glycerine can be used. Preferably, the volume percent of glycerins should be from about 1 to about 2%. Most preferably, glycerins should be present in about 1.5 volume %.

METHOD OF MANUFACTURE

The pollution remedial composition of the present invention was made by adding with agitation, about 0.5%, based on the total volume of the final remedial composition, of an organo phosphoric acid ester anionic surfactant, T MULZ 598 480, to water present in an amount of about 40 volume % to obtain a first substantially homogeneous resultant mixture. Then, with agitation, about 1.5 volume % of ethylene glycol was added to the first resultant mixture to obtain a second substantially homogeneous resultant mixture. Subsequently, still with agitation, about 0.5%, based on the total weight of the final remedial composition, of a combination of equal amount of citric acid and sodium chloride was added to the second resultant mixture to obtain a third substantially homogeneous resultant mixture. Finally, about 57.5 volume % of sodium silicate was added, accompanied by agitation, to the third resultant mixture to give a substantially homogeneous said remedial composition.

COMPOSITION

The following composition is representative of the present invention.

| Component | % |
| --- | --- |
| Sodium Silicate | 57.5 (by volume) |
| Ethylene Glycol | 1.5 (by volume) |
| T MULZ 590 480 | 0.5 (by volume) |
| Sodium Chloride | 0.25 (by weight) |
| Citric Acid | 0.25 (by weight) |
| Water | 40 (by volume) |

This pollution remedial composition is stable and effectively decontaminates pollutants from a soil sample or from water having pollutants floating thereon. The pollution remedial composition can also be used to de-grease a driveway or a human body surface. Further, the pollution remedial composition is effective in putting out fire. Moreover, the pollution remedial composition can be used, in a closed system, to recover mercury from a sludge.

INDUSTRIAL APPLICABILITY

EXAMPLE 1

To a liquid contaminant, such as an insecticide, a petroleum product, or a chlorinated hydrocarbon, placed in a jar was added about 25 volume % of the pollution remedial composition of the present invention. The mixture was then agitated until the ingredients were well mixed. The mixture generally turned cloudy, and was sent to a commercial laboratory for quantitative analysis of the residual liquid contaminant. A control, without being treated with the pollution remedial composition of the present invention, was also analyzed similarly. Generally, after sitting for a period of from about two to three weeks, solid matrix formed and precipitated to the bottom of the jar.

The test results obtained are shown in FIGS. 1–5. It can be seen from these figures that in each instance, the concentration of the liquid contaminant in the residue dramatically decreased after treatment with the pollution remedial composition of the present invention.

Figure 5:
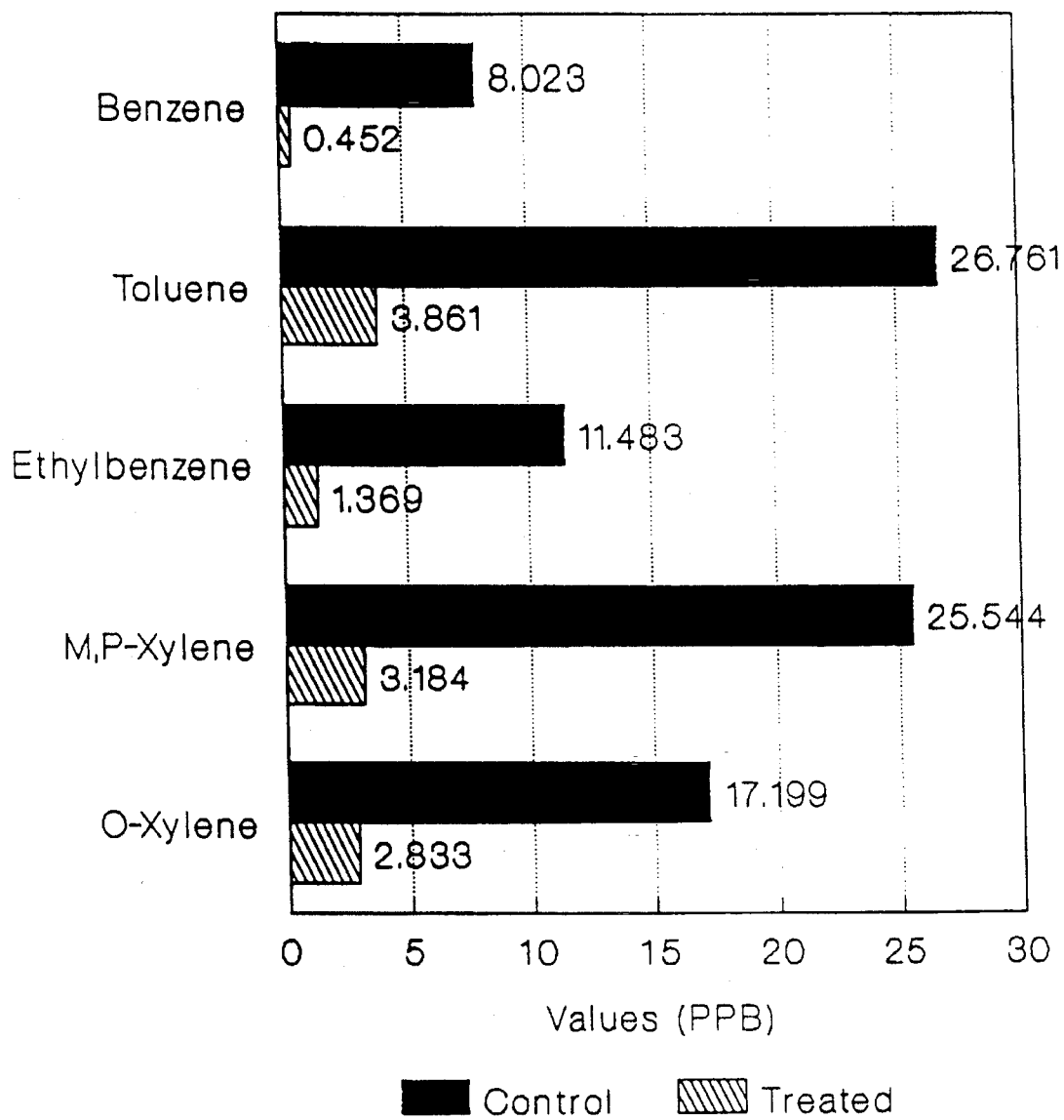
FIG. 5 is a graph depicting changes in the concentration of various petroleum products before and after treatment with the pollution remedial composition of the present invention.

FIG. 5 shows the test results obtained from treating each of benzene, toluene, ethylbenzene, a mixture of m-xylene and p-xylene, and o-xylene with the pollution remedial composition of the present invention,. In every case, the concentration of the treated chemical was significantly lower than that of the control.

EXAMPLE II

To clean a driveway stained with oil, grease, paint, etc., the pollution remedial composition of the present invention was applied to the stained area. After the application, either one of the two options was used: (1) The composition was allowed to stay in the driveway to dry, giving a clean driveway when dried; or (2) the composition was allowed to stand for 15 to 30 minutes on the driveway which was then flushed with water to wash the stain off from the area.

EXAMPLE III

To clean greasy-oily hands, the pollution remedial composition of the present invention was applied to the hands. Hands were rubbed together to evenly coat areas of grease and oil. Hands were then washed under water to get rid of the grease, oil and the composition.

EXAMPLE IV

The effectiveness of a treatment method depends on the types of soil to be treated, the types of contaminants present in the soil, and the depth of contaminants present in the soil.

Generally, the pollution remedial composition of the present invention can be used to remedy an area of ground polluted with contaminants as follows: Administering evenly to a polluted area of about 1 cubic yard 2 gallons of the pollution remedial composition to decontaminate the area. Simultaneously, the area is evenly tilled until the pollution remedial composition is substantially well dispersed in the area. Finally, the area should be allowed to dry.

(A) If only a shallow layer of soil is contaminated, such as from about three inches to about one foot in depth of contamination, the tiller method should be used. In this method, the tiller with spray jets attached thereto would be used. At a slow speed, the tiller will till the soil and the spray jets would emit the pollution remedial composition to saturate the soil with the composition. After air drying, the contaminants will be encased in a glass-like matrix.

(B) If a relatively deep layer of soil is contaminated, such as from about two to about four feet in depth of contamination, the method described above would still be used except it would take two stages. The first step would be as the treatment described above, and the next step would be to remove the first treated layer, lay it aside, and repeat the procedure on the next layer of soil. After this process has been done and the contaminant has been treated, the treated soil may then be returned to its original place.

(C) Where the contaminant penetrates deep into the soil, then it is necessary to remove the layer of contaminated soil by using a front-end loader-type of machinery and putting the soil removed through a pug mill. As the soil is processed through the pug mill, the soil is thoroughly saturated with the pollution remedial composition of the present invention. When the process is finished, the soil will be ejected into a pile and, later, after all contaminates from the deepest region have been treated, the soil will be returned to the original location.

(D) In areas where contaminated soil cannot be removed or in lieu of the pug mill method, then one or more perforated pipes may be injected into the ground, and the pollution remedial composition of the present invention can be slowly introduced into the perforated pipes to allow the composition to slowly penetrate the contaminated soil. This decontamination process is a slower process than the pug mill method or the tiller method because this process does not provide an aerated means, but the end results will be the same.

EXAMPLE V

Where contaminants are present in the water, then by adding to the water the pollution remedial composition of the present invention, the contaminants are segregated. The contaminants will be encased in a glass-like matrix and separated from the water. The glass-like matrix will sink to the bottom, leaving the water clean from contaminants.

EXAMPLE VI

Depending on the type of fire, either forest, oil, or grass, the composition of the present invention is to be sprayed on the fire at low pressure, or in instances of larger fires, the composition of the present invention may be applied from the air in a spray or dump motion.

EXAMPLE VII

The recovery of mercury from sludge can be accomplished by introducing the sludge through an agitation pug mill. The composition of the present invention is then applied to the sludge with agitation. The amount of the composition used is determined by the type of sludge to work on. The sludge would be put into the pug mill, and the composition of the present invention would be added and blended to evenly distribute the material therein. The pug mill needs to be slanted at an angle so that the recovered mercury can be collected at the bottom and be drained off.

The invention now being fully described, it will be apparent to one of ordinary skill in the art that many changes and modifications can be made thereto without departing from the spirit or scope of the invention as defined in the following claims.

What is claimed is:

1. A pollution remedial composition comprising:

from about 40 to about 75 volume % of a soluble silicate;

from about 0.25 to about 5 volume % of a surfactant;

from about 1 to about 5 volume % of a polyol;

and the remainder water.

2. The pollution remedial composition of claim 1 wherein said soluble silicate is sodium silicate.

3. The pollution remedial composition of claim 1 wherein said surfactant is an anionic surfactant.

4. The pollution remedial composition of claim 3 wherein said anionic surfactant is an ester of organo-phosphoric acid.

5. The pollution remedial composition of claim 1 wherein said polyol is ethylene glycol.

6. The pollution remedial composition of claim 1 further comprising from about 0.25 to about 10 weight % of a mixture of equal amount of sodium chloride and citric acid.

7. The pollution remedial composition of claim 6 further comprising from about 0.2 to about 1 weight % of a mixture of equal amount of sodium chloride and citric acid.

8. The pollution remedial composition of claim 1 further comprising from about 1 to about 2 volume % of glycerine, 9. The pollution remedial composition of claim 1 wherein said soluble silicate is from about 55 to about 60 volume %, 10. The pollution remedial composition of claim 1 wherein said surfactant is from about 0.25 to about 1 volume %, 11. The pollution remedial composition of claim 1 wherein said polyol is from about 1 to about 2 volume %.

12. A pollution remedial composition comprising:
   from about 40 to about 75 volume % of a soluble alkali metal silicate;
   from about 0.25 to about 5 volume % of an anionic surfactant;
   from about 1 to about 5 volume % of ethylene glycol; and
   the remainder water.

13. The pollution remedial composition of claim 12 wherein said anionic surfactant is an ester of organo-phosphoric acid.

14. The pollution remedial composition of claim 12 further comprising from about 0.2 to about 10 weight % of a mixture of equal amount of sodium chloride and citric acid.

15. The pollution remedial composition of claim 12 further comprising from about 1 to about 2 volume % of glycerine.

16. The pollution remedial composition of claim 12 wherein said soluble alkali metal silicate is from about 55 to about 60 volume %.

17. The pollution remedial composition of claim 12 wherein said anionic surfactant is from about 0.25 to about 1 volume %.

18. The pollution remedial composition of claim 12 wherein said ethylene glycol is from about 1 to about 2 volume %.

19. A pollution remedial composition comprising:
   from about 55 to about 60 volume % of a sodium silicate;
   from about 0.25 to about 1 volume % of an anionic surfactant;
   from about 1 to about 2 volume % of a ethylene glycol;
   from about 0.1 to about 0.5 weight % of sodium chloride;
   from about 0.1 to about 0.5 weight % of citric acid; and
   the remainder water.

20. The pollution remedial composition of claim 19 wherein said anionic surfactant is an ester of organo-phosphoric acid.

21. The pollution remedial composition of claim 19 wherein said sodium silicate is about 57.5% volume.

22. The pollution remedial composition of claim 19 wherein said anionic surfactant is about 0.5% volume.

23. The pollution remedial composition of claim 19 wherein said ethylene glycol is about 1.5% volume.

24. The pollution remedial composition of claim 19 wherein said sodium chloride is about weight 0.25%.

25. The pollution remedial composition of claim 19 wherein said citric acid is about weight 0.25%.

26. A pollution remedial composition comprising:
   about 57.5 volume % of sodium silicate;
   about 0.5 volume % of an ester of organo-phosphoric acid;
   about 1.5 volume % of ethylene glycol;
   about 0.25 weight % of sodium chloride;
   about 0.25 weight % of citric acid; and
   the remainder water.

27. A method for preparing a pollution remedial composition comprising the steps of:
   adding, with agitation, from about 0.25 to about 1 volume % of an anionic surfactant to water ranging from about 35 to about 45 volume % to obtain a first substantially homogeneous resultant mixture;
   adding, with agitation, from about 1 to about 2 volume % of ethylene glycol to said first resultant mixture to obtain a second substantially homogeneous resultant mixture;
   adding, with agitation, from about 0.2 to about 1 weight percent of a combination of equal amount of citric acid and sodium chloride to said second resultant mixture to obtain a third substantially homogeneous resultant mixture; and
   adding, with agitation, from about 55 to about 60 volume % of sodium silicate to said third resultant mixture to give a substantially homogeneous said remedial composition.

* * * * *